Patented Mar. 3, 1942

2,275,261

UNITED STATES PATENT OFFICE 2,275,261

OPACIFIER FOR ENAMELS

Walter Kerstan, Frankfort-on-the-Main, Germany, assignor to Deutsche Gold-und Silber-Scheideanstalt, vormals Roessler, Frankfort-on-the-Main, Germany, a corporation of Germany No Drawing. Application April 3, 1940, Serial No. 327,733. In Germany March 27, 1939

1 Claim. (Cl. 106—312)

At present numerous opacifiers for enamels are known among them also cerium dioxide which is extensively used as opacifier. A further enhancement of its utilization as opacifier is hampered by its relatively high cost and by the fact that the material has to be imported.

Now it was found that a valuable opacifier for enamels is obtained by mixing cerium dioxide with alkalized clay. Surprisingly, the substitution of one part of cerium dioxide by alkalized clay leads not only to considerable economic but also to valuable technical effects. Comparative tests have shown that mixtures of cerium dioxide and alkalized clay give much better opacifying effects as could be expected in view of the qualities of the single components of the mixture. An opacifier which, in accordance with my invention, contains 1 part of cerium dioxide and 6 parts of alkalized clay possesses at least the same good opacifying effect as an opacifier with 2 parts of cerium dioxide and 6 parts of untreated, i. e. unalkalized clay.

In carrying out my invention I prefer to use cerium dioxide and an alkalized clay which is obtained by mixing clay, for instance, enamel clay with solutions or suspensions of alkaline substances, such as soda lye, potash lye, potassium carbonate, ammonia or barium hydroxide and subsequently drying of the mixture. It has proved advantageous to subdivide the alkalized clay before the mixing with cerium dioxide or basic cerium sulfate whereupon the resulting white opacifier is given immediately to the mill. If preferred, the thorough mixing may be carried out also in the mill itself.

The utilization of alkalized clay per se as opacifier was already known. It could, however, not be foreseen that just alkalized clay was suited to nearly substitute the opacifying qualities of cerium dioxide or even to improve them. Contrary to this observation non-alkalized clay mixed with cerium dioxide was without any opacifying effect.

Example 50 kgrs. of customary enamel clay are added to a solution of 2 to 5 kgrs. caustic soda or potassium hydroxide in 20 liters of water and the mixture agitated in a stirring device during half an hour under further addition of 10 to 15 liters of water. The suspension of clay is then dried in a steam drying oven at a temperature of about 50 to 80° C. The dried material is ground and ready for utilization. 100 kgrs. of granulated frit are added to the mill together with 1 percent cerium dioxide and 6 percent of the alkalized clay. The resulting slip is employed as usual for firing and gives an excellent white enamel.

What I claim is:

An opacifying agent for enamels which comprises a mixture of one part of cerium dioxide and six parts of alkalized clay, said alkalized clay having been prepared by mixing enamel clay with an alkaline solution or suspension of an alkalizing agent selected from the group which consists of sodium hydroxide, potassium hydroxide, potassium carbonate, ammonia, and barium hydroxide, and then drying said mixture.

WALTER KERSTAN.